(12) United States Patent
Liu et al.

(10) Patent No.: US 11,474,390 B2
(45) Date of Patent: Oct. 18, 2022

(54) DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Hao Liu, Beijing (CN); Kaixuan Wang, Beijing (CN); Ruichen Zhang, Beijing (CN)

(73) Assignees: BEIJING BOE DISPLAY TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 101 days.

(21) Appl. No.: 16/936,353

(22) Filed: Jul. 22, 2020

(65) Prior Publication Data
US 2021/0088838 A1  Mar. 25, 2021

(30) Foreign Application Priority Data

Sep. 23, 2019 (CN) .......................... 201921583623.0

(51) Int. Cl.
*G02F 1/1335* (2006.01)
*G02F 1/1333* (2006.01)
*G02F 1/1347* (2006.01)
*G06F 3/044* (2006.01)
*G02F 1/1362* (2006.01)

(52) U.S. Cl.
CPC .... *G02F 1/133526* (2013.01); *G02F 1/13338* (2013.01); *G02F 1/13471* (2013.01); *G02F 1/133512* (2013.01); *G02F 1/133342* (2021.01); *G02F 1/136286* (2013.01); *G06F 3/0443* (2019.05)

(58) Field of Classification Search
CPC ............. G02F 1/1333; G02F 1/133526; G02F 1/133512; G02F 1/1335; G02F 1/13338; G02F 1/133342; G02F 1/13471; G09G 2300/023; G02B 27/0172; G02B 30/27; G06F 3/041
See application file for complete search history.

(56) References Cited

U.S. PATENT DOCUMENTS

2015/0241728 A1* 8/2015 Hata .................... G02F 1/13338
345/173
2020/0057324 A1* 2/2020 Chu-Ke .............. G02F 1/13471

\* cited by examiner

*Primary Examiner* — Xuemei Zheng
(74) *Attorney, Agent, or Firm* — McCoy Russell LLP

(57) ABSTRACT

A display panel is provided, which includes a first sub-panel and a second sub-panel arranged opposite to each other, wherein the first sub-panel comprises a plurality of pixel units, the second sub-panel comprises a plurality of functional units, each of the functional units corresponds to respective at least one of the pixel units, and an optical lens layer is arranged between the first sub-panel and the second sub-panel, and configured to form a real image of the functional unit or the pixel unit between the functional unit and the pixel unit, wherein a size of the real image of the functional unit is equal to a size of the functional unit, and a size of the real image of the pixel unit is equal to a size of the pixel unit. A display device is further provided.

16 Claims, 4 Drawing Sheets

DISPLAY PANEL AND DISPLAY DEVICE

CROSS-REFERENCE TO RELATED APPLICATIONS

The present application claims a priority to Chinese Patent Application No. 201921583623.0 filed in China on Sep. 23, 2019, the disclosure of which is incorporated herein by reference in its entirety.

TECHNICAL FIELD

The present disclosure relates to the technical field of display product manufacturing, and in particular to a display panel and a display device.

BACKGROUND

At present, in order to improve contrast of a display product, a dual cell display panel overlapping method is adopted, wherein the dual cell display panel generally includes a display panel with a RGB pixel unit and a light-controlled panel with a light-controlled unit, and the RGB pixel units and the light-controlled units are designed to be in integral multiple periods to prevent a defect of Moire pattern. However, considering observation of human eyes, since the human eye is at a fixed viewpoint, there is still a certain distance between the RGB pixel unit and the light-controlled unit, the RGB pixel unit of the display panel is shielded by the light-controlled unit of the light-controlled panel in an nonuniform manner, and the human eye may observe color stripes at different positions of the panels.

SUMMARY

In order to solve the above technical problems, the present disclosure provides a display panel and a display device.

In order to achieve the above purpose, technical solutions adopted by the present disclosure are as follows. A display panel is provided, which includes a first sub-panel and a second sub-panel arranged opposite to each other, wherein the first sub-panel includes a plurality of pixel units, and the second sub-panel includes a plurality of functional units, each of the functional units corresponds to respective at least one of the pixel units, and an optical lens layer is arranged between the first sub-panel and the second sub-panel, and configured to form a real image of the functional unit or the pixel unit between the functional unit and the pixel unit, wherein a size of the real image of the functional unit is equal to a size of the functional unit, and a size of the real image of the pixel unit is equal to a size of the pixel unit.

Optionally, the optical lens layer includes a plurality of convex lenses arranged in an array, and optical axes of the convex lenses are arranged perpendicular to a light-emitting surface of the second sub-panel.

Optionally, each of the convex lenses is a plano-convex lens or lenticular lens.

Optionally, each of the convex lenses corresponds to respective at least one of the functional units.

Optionally, a distance between the functional unit and the respective at least one of the pixel units is 4 times a focal length of the convex lens.

Optionally, the size of each of the pixel units is same as a size of each of the convex lenses, and a curvature radius r of each of the convex lenses satisfies a formula: r=d/4(n−1)>p/2, wherein d represents a distance between the pixel unit and the functional unit, n represents a refractive index of the convex lens, and p represents a size of each of the pixel units.

Optionally, a thickness s of each of the convex lenses satisfies a formula:

$$s = r - \sqrt{r^2 - \frac{p^2}{4}},$$

wherein r represents a curvature radius of each of the convex lenses, and p represents the size of each of the pixel units.

Optionally, the second sub-panel is a light-controlled panel, and the functional unit is a light-controlled unit.

Optionally, the light-controlled unit includes a part of a substrate of the light-controlled panel and a black matrix arranged on the part of the substrate of the light-controlled panel.

Optionally, the optical lens layer is configured to form a real image of the light-controlled unit between the light-controlled unit and the pixel unit, a size of the real image of the light-controlled unit is equal to a size of the light-controlled unit, and a distance between the real image of the light-controlled unit and the respective pixel unit is less than a distance between the real image of the light-controlled unit and the light-controlled unit.

Optionally, the second sub-panel is a touch panel, and the functional unit is a touch sensing unit.

Optionally, the touch sensing unit includes at least one touch electrode.

Optionally, the touch sensing unit is made of Indium Tin Oxide (ITO).

Optionally, the optical lens layer is configured to form the real image of the pixel unit between the touch sensing unit and the pixel unit, the size of the real image of the pixel unit is equal to the size of the pixel unit, and a distance between the real image of the pixel unit and the respective touch sensing unit is less than a distance between the real image of the pixel unit and the pixel unit.

Optionally, an orthographic projection of the functional unit onto the optical lens layer completely coincides with a respective convex lens.

The present disclosure also provides a display device including the above-mentioned display panel.

DETAILED DESCRIPTION

Figure 1:
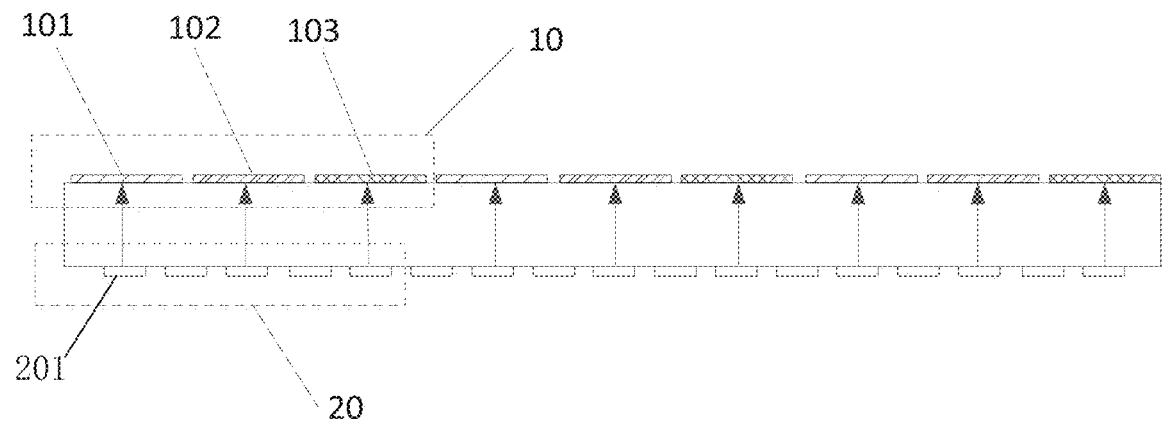
FIG. 1 shows a schematic diagram of overlapping effect of a pixel unit and a light-controlled unit in an ideal scenario.

In order to make objects, technical solutions, and advantages of the embodiments of the present disclosure more clearly, the technical solutions of the embodiments of the present disclosure will be clearly and completely described below in conjunction with the drawings of the embodiments of the present disclosure. It is apparent that the described embodiments are a part of the embodiments of the present disclosure, and not all of them. All other embodiments obtained by a person of ordinary skills in the art based on the described embodiments of the present disclosure fall within the protection scope of the present disclosure.

In a product design of a dual cell display panel, the dual cell display panel generally has following two structures. In a first structure, the dual cell display panel generally includes a first sub-panel 1 and a second sub-panel 2 that are overlapped with each other, and the first sub-panel 1 and the second sub-panel 2 are connected by optical adhesive 3, wherein the first sub-panel 1 is generally a Liquid Crystal Display (LCD) panel, which includes a color filter substrate and an array substrate arranged opposite to each other, the array substrate includes a plurality of gate lines and a plurality of data lines, the plurality of gate lines and the plurality of data lines cross each other to define a plurality of pixel units, and each pixel unit includes RGB sub-pixels (a Red sub-pixel 101, a Green sub-pixel 102, and a Blue sub-pixel 103); the second sub-panel is a light-controlled panel, which can adjust s own brightness to improve contrast of the LCD panel, and the light-controlled panel is a black-and-white display panel, which includes an first substrate and a second substrate arranged opposite to each other, a plurality of gate lines and data lines are arranged on the second substrate, and the plurality of gate lines and data lines define a plurality of light-controlled units. Since the light-controlled panel is a black-and-white display panel, the light-controlled unit does not have the RGB sub-pixels, and only includes a Black Matrix (BM) for preventing light leakage, and a period of the BM of the light-controlled panel is an integral multiple or an approximate integral multiple a period of the RGB sub-pixels of the LCD panel.

Figure 2:
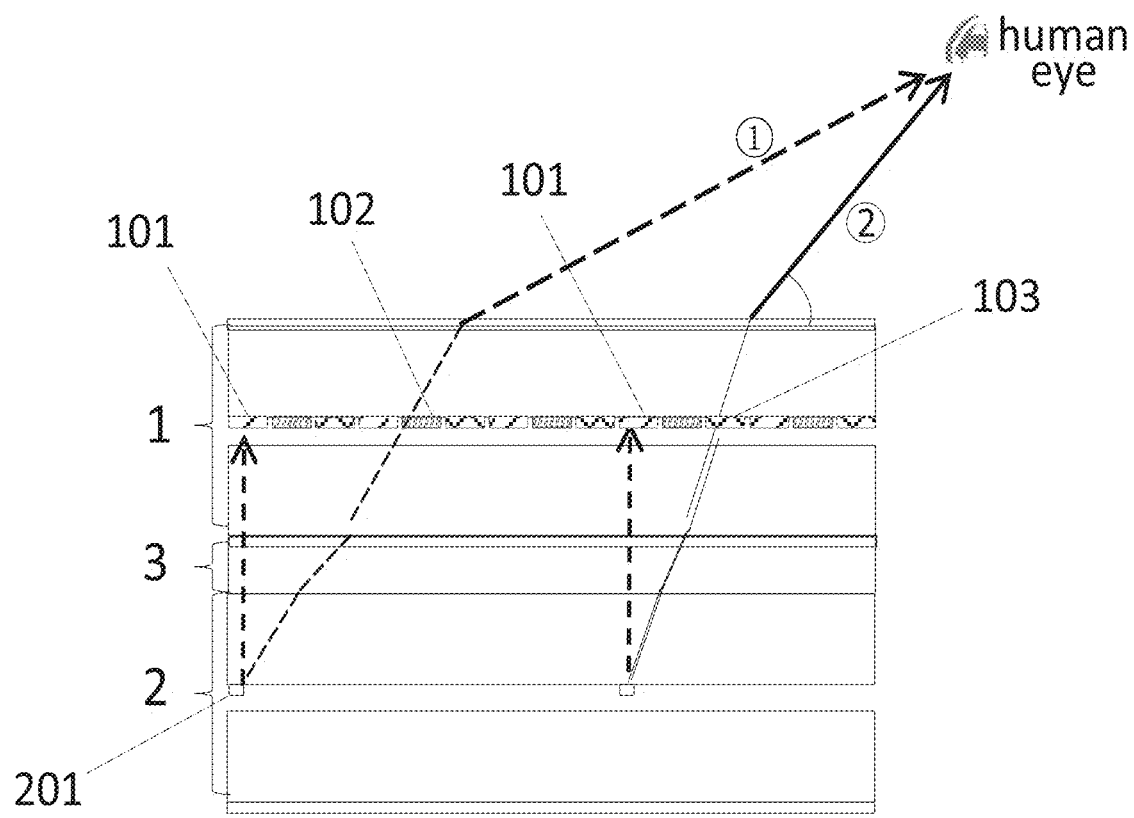
FIG. 2 shows a schematic diagram of an optical path where color stripes appear when a second sub-panel is a light-controlled panel.

FIG. 1 is a schematic diagram of overlapping effect of the pixel unit and the light-controlled unit in an ideal scenario. In FIG. 1, a light-controlled unit 20 included in a light-controlled panel 2 is represented by only a BM 201. Ideally, the BM 201 of the light-controlled panel 2 is simply overlapped with the RGB sub-pixels included in an LCD panel 1, and the BM 201 directly corresponds to the RGB sub-pixels, and the BM that is on the lower light-controlled panel and distributed along a direction of each data line shields color resistances of a same color, that is, the sub-pixels of the same color, but this situation is actually unlikely to happen. As shown in FIG. 2 (for ease of explanation, only the BM 201 corresponding to the red sub-pixel 101 is shown in FIG. 2), because a human eye is at a fixed location, when the human eye observes different positions of the dual cell display panel, there is a certain angle with respect to an observed position, and because there is a gap formed by a three-dimensional structure (such as glass and adhesive material) between the BM of the light-controlled panel and the RGB sub-pixels of the LCD panel, a thickness of the gap is much larger than a thickness of the BM or the RGB sub-pixels. As a result, the ideal and simple overlapping model cannot be established, mutual shielding relationship changes, and the BM at a starting position of an optical path ① should shield the red sub-pixel 101 in the ideal scenario, but actually, due to a viewing angle and refraction, the BM shields the green sub-pixel 102; similarly, the BM at a starting position of the optical path ② should shield the red sub-pixel 101 in the ideal scenario, but actually it shields the blue sub-pixel 103. Ideally, a period of the BM of the light-controlled panel is an integral multiple of the period of the RGB sub-pixels of the display panel, the BM of the light-controlled panel is overlapped with RGB sub-pixels of the display panel in the ideal scenario, a BM being directly opposite to sub-pixels of a same color should shield the sub-pixels of that color within an entire screen, and the colors of the entire screen are uniform. However, in reality, due to existence of the gap and the viewing angle being formed relative to the human eye at the fixed location, the BM being directly opposite to the sub-pixels of the same color shields sub-pixels of different colors within the entire screen, resulting in that the colors are not uniform, and rainbow stripes of mixed colors (such as pink, yellow, and cyan) are formed.

In order to fundamentally prevent the defect of rainbow stripes, an effective way is to reduce the gap between the respective pixel unit and light-controlled unit, so that ununiformed shielding of the pixel unit caused by a difference in the viewing angles will be reduced or even be eliminated. However, it is almost impossible to directly eliminate the gap between the pixel unit and the light-controlled unit, because there is often a liquid crystal cell, glass, Optically Clear Adhesive (OCA) material (optical adhesive), a polarizer), or the like between the pixel unit and the light-controlled unit.

Figure 3:
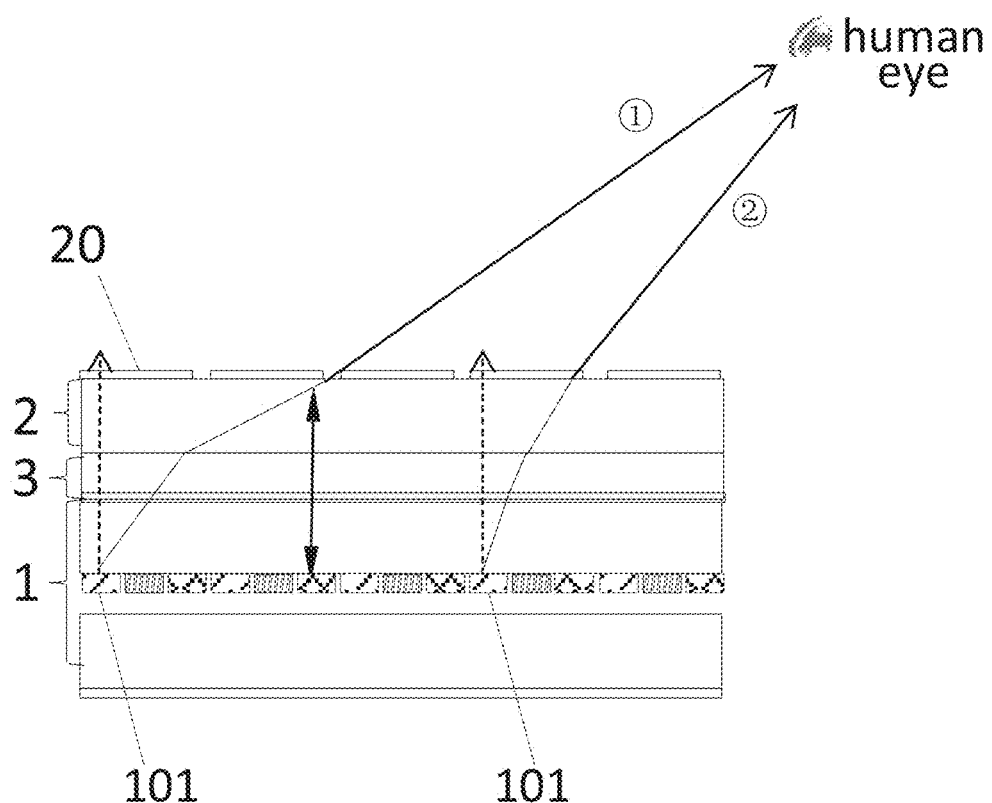
FIG. 3 shows a schematic diagram of an optical path where color stripes appear when a second sub-panel is a touch panel.

In a second structure of the dual cell display panel, the dual cell display panel includes a first sub-panel 1 and a second sub-panel 2 that are overlapped with each other, the first sub-panel 2 is a touch panel, the touch panel includes a touch sensing unit 20 formed by an Indium Tin Oxide (ITO) electrode, and a gap between the ITO electrode and an adjacent ITO electrode causes a difference in transmittance and forms a pattern; the second sub-panel 1 is an LCD panel, which includes a color filter substrate and an array substrate arranged opposite to each other, the array substrate includes a plurality of gate lines and a plurality of data lines, the plurality of gate lines and the plurality of data lines cross each other to define a plurality of pixel units, and each pixel unit includes RGB sub-pixels (a red sub-pixel 101, a green sub-pixel 102, and a blue sub-pixel 103), as shown in FIG. 3.

Ideally, a sensor ITO (a touch sensing unit) of the touch panel is simply overlapped with the RGB sub-pixels of the LCD panel, and the sensor ITO directly corresponds to the RGB sub-pixels. In order to facilitate design of a sensor ITO pattern on the touch panel, a period of the touch sensing unit is often consistent with that of the RGB sub-pixels of the display panel. When the touch sensing unit and the RGB sub-pixels are simply overlapped and gaps between two adjacent touch sensing units of the touch panel all correspond to a kind of color resistance (i.e., sub-pixels of a same color) of the display panel within the entire screen, the colors of the entire screen are in uniform. However, in reality, because the human eye is at a fixed position, actually respective different viewing angles are formed between the human eye and respective different positions of the display panel. In addition, because there is a gap formed by glass and adhesive material between the RGB sub-pixels of the display panel and the touch sensing unit of the touch panel, the thickness of the gap is much larger than the thickness of the BM or the RGB sub-pixels. As a result, the ideal and simple overlapping model cannot be established, and the mutual shielding relationship changes. As shown in FIG. 3, in the simple overlapping model, the red sub-pixels 101 where the optical paths ① and ② passes through were ideally shielded by the touch sensing unit 20; however, due to a change in the mutual shielding relationship caused by the viewing angle, the red sub-pixels 101 in the optical path ① is observed through a gap between the touch sensing units 20, and the red sub-pixel 101 in the optical path ② is shielded by the touch sensing unit 20. In this way, different regions of the entire screen will form color differences due to different degrees of shielding of the sub-pixels of the same color by the touch sensing units, resulting in mixed color stripes, that is, rainbow stripes.

In view of a phenomenon that color stripes appear in the dual cell display panel in the related art, an embodiment of the present disclosure provides a display panel including a first sub-panel and a second sub-panel that are overlapped with each other, and an optical lens layer is arranged between the first sub-panel and the second sub-panel, and configured to form a real image of the functional unit between the pixel unit on the first sub-panel and the functional unit on the second sub-panel, wherein a size of the real image of the functional unit is equal to a size of the functional unit, thereby shortening a distance between the pixel unit and the functional unit, and improving color stripe phenomenon. In addition, arrangement of the optical lens layer can even enable the distance between the pixel unit and the functional unit to be zero, thereby eliminating the color stripe phenomenon.

Figure 4:
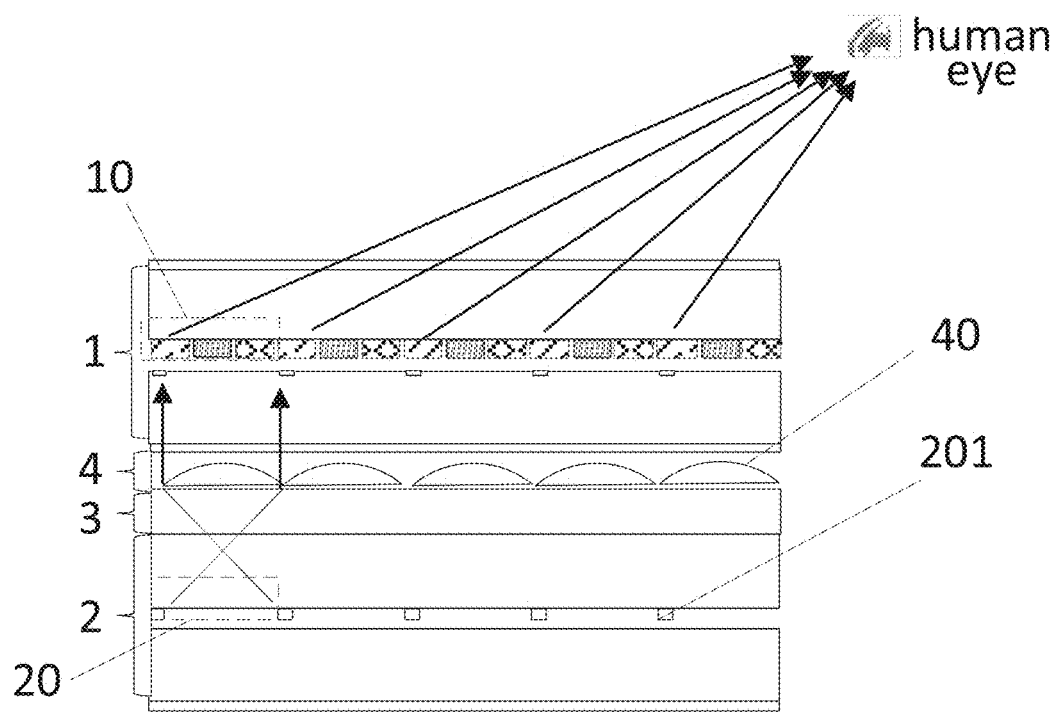
FIG. 4 shows a first schematic structural diagram of a display panel in an embodiment of the present disclosure.
Figure 7:
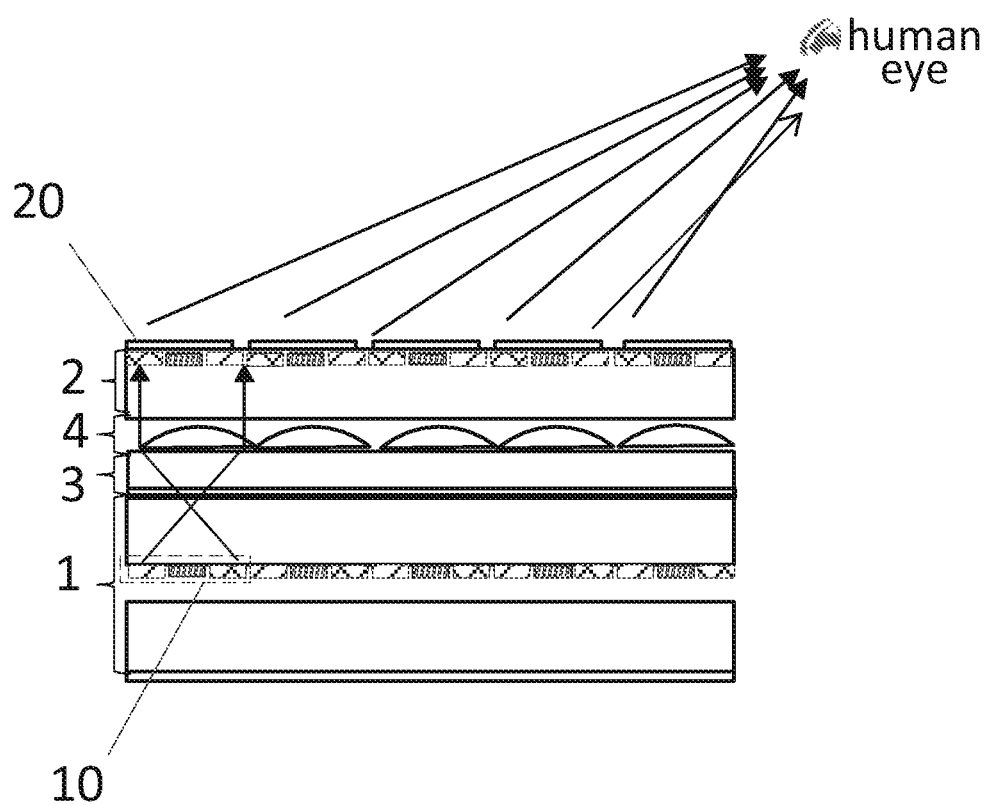
FIG. 7 shows a second structural diagram of a display panel in an embodiment of the present disclosure.

Specifically, as shown in FIGS. 4 and 7, an embodiment of the present disclosure provides a display panel including a first sub-panel 1 and a second sub-panel 2 that are overlapped with each other, wherein the first sub-panel 1 includes a plurality of pixel units 10, and the second sub-panel 2 includes a plurality of functional units 20, each of the functional units 20 corresponds to respective at least one of the pixel units 10, and an optical lens layer 4 is arranged between the first sub-panel 1 and the second sub-panel 2, and configured to form a real image of the functional unit 20 between the pixel unit and the functional unit, wherein a size of the real image of the functional unit 20 is equal to a size of the functional unit 20.

According to an imaging rule of a convex lens, when an object is at a position of twice a focal length of a lens, an inverted real image of the object appears on the other side of the lens, wherein a size of the inverted real image is equal to a size of the object. In the embodiment of the present disclosure, on the basis of such imaging rule, the optical lens layer 4 is provided to form an equal-sized real image of the functional unit 20 between the pixel unit and the functional unit, such that a relationship between the functional unit 20 and the corresponding at least one of the pixel units 10 is converted into a relationship between the image of the functional unit 20 and the corresponding at least one of the pixel units 10, and a distance between the image of the functional unit 20 and the at least one of the pixel units 10 is less than a distance between the functional unit 20 and the at least one of the pixel units 10, that is, the image of the functional unit 20 and the at least one of the pixel units 10 are on a same plane or proximate to each other, which indirectly serves to eliminate a gap between the pixel unit and the functional unit, and can effectively reduce or even eliminate the defect of rainbow stripes.

It should be noted that a quantity of the at least one of the pixel units 10 corresponding to one of the functional units 20 can be set according to actual needs.

It should be noted that specific functions of the functional unit are different according to differences of specific structures and functions of the dual cell display panel. For example, when the first sub-panel is an LCD panel, the second sub-panel is a light-controlled panel, and the light-controlled panel is located on a light-entering side of the LCD panel, the functional unit is a light-controlled unit that can adjust its own light transmittance. When the first sub-panel is an LCD panel, the second sub-panel is a touch panel, and the touch panel is located on a light-emitting side of the LCD panel, the functional unit is a touch sensing unit capable of sensing a touch operation. These two structures will be further described below.

As shown in FIG. 4, in this embodiment, the second sub-panel 2 is a light-controlled panel, and the functional unit 20 is a light-controlled unit.

In a specific embodiment, the first sub-panel 1 is a color LCD panel, and includes a color filter substrate and an array substrate arranged opposite to each other. The second sub-panel 2 includes a black-and-white LCD panel without a color filter, which includes an array substrate and an opposite substrate which is aligned with the array substrate to form a cell. The light-controlled panel includes the plurality of light-controlled units, and the light-controlled units do not include the RGB sub-pixels. As shown in FIG. 4, the light-controlled unit includes a part of the array substrate and a BM 201 arranged on the part of the array substrate; in addition, the light-controlled unit may also include a metal trace arranged on the array substrate. Alternatively, the light-controlled unit may include only a BM. In FIG. 4, each pixel unit 10 in the first sub-panel 1 may include a red sub-pixel 101, a green sub-pixel 102, and a blue sub-pixel 103. One light-controlled unit corresponds to a respective one pixel unit, that is, a light-controlled unit may correspond to the red sub-pixel 101, the green sub-pixel 102, and the blue sub-pixel 103.

In this embodiment, the first sub-panel 1 is arranged on a light-emitting side of the second sub-panel 2, and the first sub-panel 1 and the second sub-panel 2 are connected by optical adhesive 3.

The optical lens layer 4 may be of various structures. In this embodiment, the optical lens layer 4 includes a plurality of convex lenses 40 arranged in an array, and optical axes of the convex lenses are arranged perpendicular to a light-emitting surface of the second sub-panel.

When one light-controlled unit corresponds to a respective one convex lens, an optical axis of the convex lens corresponding to each of the light-controlled units is in a same straight line as a center point of the light-controlled unit, and the array substrate of the light-controlled panel is provided with a gate line and a data line, the gate line and the data line cross each other to define a plurality of light-controlled units, and the center point of each of the light-controlled units is located in a straight line where the optical axis of the respective convex lens is located, then an orthographic projection of each of the light-controlled units onto the optical lens layer completely coincides with the respective convex lens, thereby enabling an orthographic projection of an image of the light-controlled unit onto the second sub-panel 2 completely coincides with a physical body of the respective light-controlled unit.

The convex lens 40 may be of various specific structures, for example, the convex lens 40 is a plano-convex lens or a biconvex lens.

In order to make the optical lens film thinner, in a specific embodiment, the convex lens 40 is a Fresnel lens.

FIG. 4 shows that the convex lens 40 is a plano-convex lens. When the convex lens 40 is a plano-convex lens, a plane side of the plano-convex lens is a side of a side of the plano-convex lens proximate to the light-controlled panel.

In this embodiment, each of the convex lenses 40 corresponds to at least one of the light-controlled units to form an inverted real image of the at least one of the light-controlled units between the pixel unit and the light-controlled unit, wherein a size of inverted real image of the at least one of the light-controlled units is equal to a size of the at least one of the light-controlled units.

As shown in FIG. 4, in this embodiment, the functional unit 20 is a light-controlled unit, one of the light-controlled units corresponds to a respective one of the pixel units 10, one of the convex lenses 40 corresponds to a respective one of the light-controlled units, and the real image of the light-controlled unit formed by the convex lens 40 is close to the corresponding pixel unit 10, thereby reducing the color stripe phenomenon.

In this embodiment, a size of one of the convex lenses 40 is same as a size of the respective light-controlled unit, so as to facilitate arrangement of the convex lens 40.

In this embodiment, centers of each of the convex lenses 40, the respective light-controlled unit, and the respective pixel unit 10 are in a straight line, that is, an orthographic projection of each of the convex lenses 40 onto the second sub-panel 2 completely coincides with the respective light-controlled unit, and an orthographic projection of the pixel unit 10 corresponding to each of the convex lenses 40 onto the second sub-panel 2 completely coincides with the respective light-controlled unit, so that the image of the light-controlled unit through the convex lens 40 corresponds exactly to the respective pixel unit 10, that is, an orthographic projection of the light-controlled unit onto the first sub-panel 1 completely coincides with an orthographic projection of the image of the light-controlled unit onto the first sub-panel 1.

In a specific embodiment, an orthographic projection of the light-controlled unit 20 onto the first sub-panel 1 has an overlapping region with the respective pixel unit 10.

In the ideal scenario, the orthographic projection of the light-controlled unit 20 onto the first sub-panel 1 completely coincides with the respective pixel unit 10, which facilitates modulation of backlight by the light-controlled unit 20 to improve the contrast in a better manner. However, the pixel unit 10 is arranged on the first sub-panel 1, and the light-controlled unit 20 is arranged on the second sub-panel 2, such that when the first sub-panel 1 and the second sub-panel 2 are aligned to form a cell, a deviation is easy to occur. Naturally, this deviation can be compensated by compensation algorithm and does not adversely affect display quality, that is, the orthographic projection of the light-controlled unit 20 onto the first sub-panel 1 may not completely coincide with the respective pixel unit 10, as long as they have an overlapping region, but subsequently the compensation algorithm is needed to achieve light uniformity.

In this embodiment, a distance between the pixel unit and the respective light-controlled unit 20 is 4 times a focal length of the convex lens 40.

Figure 5:
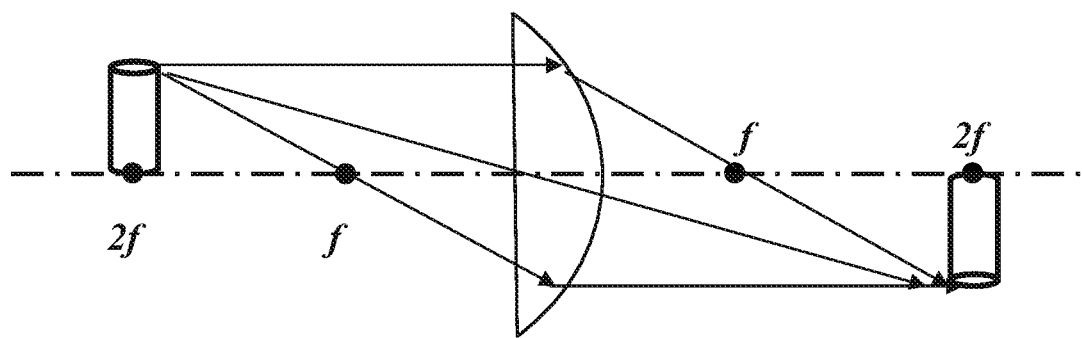
FIG. 5 shows a schematic diagram of an imaging principle of a convex lens.

According to the imaging rule of the convex lens, when an object is at a position of twice the focal length of the lens, an inverted real image of the object appears on the other side of the lens, wherein a size of the inverted real image is equal to a size of the object, as shown in FIG. 5. By using such imaging rule, the image formed by the light-controlled unit may be near the pixel unit 10, which shortens a distance between the pixel unit 10 and the respective light-controlled unit and reduces the color stripe phenomenon. The distance between the pixel unit 10 and the respective light-controlled unit is 4 times the focal length of the convex lens 40, so that the image of the light-controlled unit and the pixel unit 10 are on a same plane, the pixel unit 10 is uniformly shielded by the light-controlled unit, and colors at different positions of the display panel are uniform, so that there will be no such defect as rainbow stripes.

Figure 6:
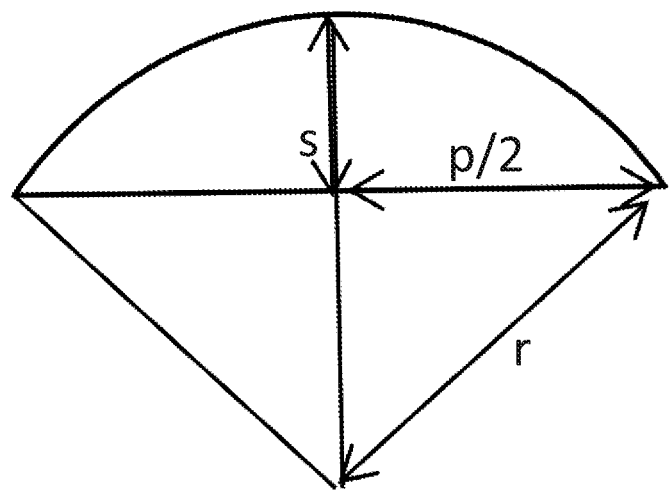
FIG. 6 shows a schematic diagram of a convex lens in an embodiment of the present disclosure.

In this embodiment, referring to FIG. 6, a size of each of the pixel units 10 is same as a size of each of the convex lenses 40, and a curvature radius r of each of the convex lenses 40 satisfies a formula: r=d/4(n−1)>p/2, wherein d represents a distance between the pixel unit 10 and the light-controlled unit, n represents a refractive index of the convex lens 40, and p represents a length of each of the pixel units 10 in an extending direction of the data line or an extending direction of the gate line.

In this embodiment, referring to FIG. 6, a thickness s of each of the convex lenses 40 satisfies a formula:

$$s = r - \sqrt{r^2 - \frac{p^2}{4}},$$

wherein r represents a curvature radius of each of the convex lenses 40, and p represents the length of each of the pixel units 10 in the extending direction of the data line or the extending direction of the gate line.

According to a principle of rainbow stripe formation and actual phenomenon of rainbow stripes, each convex lens 40 in the optical lens layer 4 may be arranged to cover a single pixel unit 10, so that its accuracy is higher, and it can also cover an entire column or an entire row of the pixel units 10, and project the entire column or the entire row of the pixel units 10. In this embodiment, each convex lens 40 in the optical lens layer 4 may be arranged to cover a single pixel unit 10, but the present disclosure is not limited thereto.

Referring to FIGS. 5 and 6, an imaging principle of the convex lens 40 may be represented by a formula $$\frac{1}{f} = (n-1)\frac{1}{r},$$

wherein f represents a focal length of the convex lens 40, n represents a refractive index of the lens, and r represents a curvature radius of the lens; d represents a distance between the pixel unit and the light-controlled unit, let d=4f, then the curvature radius of the convex lens 40 may be represented by a formula $$r = \frac{d}{4}(n-1);$$

let pixel pitch (a size of each pixel unit 10)=p, and the thickness of the convex lens 40 is s, then $$s = r - \sqrt{r^2 - \frac{p^2}{4}}.$$

At this time, as long as r=d/4(n−1)=p/2, a required shape and size of the convex lens 40 can be calculated through the distance between the pixel unit and the light-controlled unit.

In this embodiment, each of the pixel units 10 may include, but not limited to, a red sub-pixel 101, a green sub-pixel 102, and a blue sub-pixel 103.

In this embodiment, as shown in FIG. 7, the second sub-panel 2 is a touch panel, and the function unit 20 is a touch sensing unit.

The first sub-panel 1 is a color LCD panel, which includes a color filter substrate and an array substrate arranged opposite to each other.

The second sub-panel 2 is a touch panel, which includes a touch substrate and a touch electrode layer arranged on the touch substrate, and the touch electrode layer includes a plurality of touch sensing units.

In this embodiment, the second sub-panel 2 is arranged on a light-emitting side of the first sub-panel 1.

The optical lens layer 4 may be of various specific structures. In this embodiment, the optical lens layer 4 includes a plurality of convex lenses 40 arranged in an array.

The convex lens 40 may be of various specific structures, for example, the convex lens 40 is a plano-convex lens or a biconvex lens.

In order to make the optical lens film thinner, in a specific embodiment, the convex lens 40 is a Fresnel lens.

FIG. 7 shows that the convex lens 40 is a plano-convex lens. When the convex lens 40 is a plano-convex lens, a plane side of the plano-convex lens is a side of a side of the plano-convex lens proximate to the first sub-panel 1.

In an embodiment of the present disclosure, each of the convex lenses 40 corresponds to the at least one of the pixel units 10 to form an inverted real image of the at least one of the pixel units 10 between the touch sensing unit 20 and the pixel unit 10, wherein a size of the inverted real image of the at least one of the pixel units 10 is equal to a size of the at least one of the pixel unit 10.

As shown in FIG. 7, in this embodiment, one of the pixel units 10 corresponds to a respective one of the touch sensing units 20, one of the convex lenses 40 corresponds to a respective one of the touch sensing units 20, and the real image of the pixel unit 10 formed by the convex lens 40 is close to the respective touch sensing unit 20, thereby reducing the color stripe phenomenon.

In this embodiment, the size of one of the convex lenses 40 is same as a size of the respective pixel unit, so as to facilitate arrangement of the convex lens 40.

In this embodiment, centers of each of the convex lenses 40, the respective pixel unit, and the respective touch sensing unit 10 are in a straight line, that is, an orthographic projection of each of the convex lenses onto the second sub-panel completely coincides with the respective touch sensing unit, and an orthographic projection of the pixel unit corresponding to each of the convex lenses onto the second sub-panel completely coincides with the respective touch sensing unit, so that image of the pixel unit 10 through the convex lens 40 corresponds exactly to the respective touch sensing unit 20, that is, the touch sensing unit 20 completely coincides with the orthographic projection of the image of the pixel unit 10 onto the second sub-panel 2.

In this embodiment, the orthographic projection of the pixel unit 10 onto the second sub-panel 2 has an overlapping region with the respective touch sensing unit 20.

In the ideal scenario, an orthographic projection of the image of the pixel unit 10 onto the second sub-panel 2 completely coincides with the respective touch sensing unit 10, which facilitates modulation of backlight by the touch sensing unit to improve the contrast in a better manner. However, the pixel unit 10 is arranged on the first sub-panel 1, and the touch sensing unit 20 is arranged on the second sub-panel 2, such that when the first sub-panel 1 and the second sub-panel 2 are aligned to form a cell, a deviation is easy to occur. Naturally, this deviation can be compensated by compensation algorithm and does not adversely affect display quality, that is, the orthographic projection of the image of the pixel unit 10 onto the second sub-panel may not be completely coincident with the respective touch sensing unit 20, as long as they have an overlapping region, but subsequently the compensation algorithm is needed to achieve light uniformity.

In this embodiment, a distance between the touch sensing unit and the pixel unit is 4 times the focal length of the convex lens 40.

In a specific embodiment, the first sub-panel includes a plurality of pixel units, each of the pixel units includes at least one first sub-pixel, the second sub-panel is a touch panel, and the touch panel includes a plurality of touch sensing units, each of the touch sensing units includes at least one touch electrode, and a distance between the first sub-pixel and the touch electrode is 4 times the focal length of the convex lens 40.

According to the imaging rule of the convex lens, when an object is at a position of twice the focal length of the lens, an inverted real image of the object appears on the other side of the lens, wherein a size of the inverted real image is equal to a size of the object, as shown in FIG. 5. By using such imaging rule, the image formed by the pixel unit may be near the pixel unit 10, which shortens a distance between the touch sensing unit and the pixel unit and reduces the color stripe phenomenon. The distance between the touch sensing unit and the pixel unit is 4 times the focal length of the convex lens 40, so that the image of the pixel unit and the touch sensing unit are on a same plane, the image of the pixel unit 10 is uniformly shielded by the touch sensing unit 20, and colors at different positions of the display panel are uniform, so that there will be no such defect as rainbow stripes.

In this embodiment, referring to FIG. 6, a size of each of the touch sensing units 20 is same as the size of each of the convex lenses 40, and the curvature radius r of each of the convex lenses 40 satisfies the formula: r=d/4(n−1)>p/2, wherein d represents a distance between the pixel unit 10 and the touch sensing unit 20, n represents the refractive index of the convex lens 40, and p represents a size of each of the touch sensing units 20 (a length in an extending direction of the data line or an extending direction of the gate line).

In this embodiment, referring to FIG. 6, the thickness s of each of the convex lenses 40 satisfies a formula:

$$s = r - \sqrt{r^2 - \frac{p^2}{4}},$$

wherein r represents a curvature radius of each of the convex lenses 40, and p represents the size of each of the touch sensing unit 20.

According to the principle of the rainbow stripe formation and the actual phenomenon of the rainbow stripes, each convex lens 40 in the optical lens layer 4 may be arranged to cover a single pixel unit 10, so that its accuracy is higher, and it can also cover an entire column or an entire row of the pixel units 10, and project the entire column or the entire row of the pixel units 10, In this embodiment, each convex lens 40 in the optical lens layer 4 may be arranged to cover a single pixel unit 10, but the present disclosure is not limited herein.

Referring to FIGS. 5 and 6, an imaging principle of the convex lens may be represented by a formula $$\frac{1}{f} = (n-1)\frac{1}{r},$$

wherein f represents a focal length of the convex lens 40, n represents a refractive index of the lens, and r represents a curvature radius of the lens; d represents a distance between the pixel unit and the touch sensing unit, let d=4f, then the curvature radius of the convex lens 40 may be represented by a formula $$r = \frac{d}{4}(n-1);$$

let pixel pitch (a size of each touch sensing unit 20)=p, and the thickness of the convex lens 40 is s, then $$s = r - \sqrt{r^2 - \frac{p^2}{4}}.$$

At this time, as long as r=d/4(n−1)>p/2, a required shape and size of the convex lens 40 can be calculated through the distance between the pixel unit and the touch sensing unit.

In this embodiment, each of the pixel units 10 may include, but not limited to, a red sub-pixel 101, a green sub-pixel 102, and a blue sub-pixel 103.

The present disclosure further provides a display device including the above-mentioned display panel.

The display device may be any product or component with a display function, such as a liquid crystal television, an LCD, a digital photo frame, a mobile phone, a tablet computer, etc., wherein the display device further includes a flexible circuit board, a printed circuit board and a back board.

The above are preferred embodiments of the present disclosure, and it should be noted that a person of ordinary skills in the art can make further improvements and modifications without departing from the principle of the present disclosure, and these improvements and modifications should also be considered to fall within the protection scope of the present disclosure.

The invention claimed is:

1. A display panel comprising a first sub-panel and a second sub-panel arranged opposite to each other,
   wherein the first sub-panel comprises a plurality of pixel units, and the second sub-panel comprises a plurality of functional units, each of the functional units corresponds to respective at least one of the pixel units, and an optical lens layer is arranged between the first sub-panel and the second sub-panel, and configured to form a real image of each of the functional units or each of the pixel units between the functional unit and the pixel unit, wherein a size of the real image of the functional unit is equal to a size of the functional unit, and a size of the real image of the pixel unit is equal to a size of the pixel unit,
   wherein the optical lens layer comprises a plurality of convex lenses arranged in an array, and optical axes of the convex lenses are arranged perpendicular to a light-emitting surface of the second sub-panel, and
   wherein a distance between the functional unit and the respective at least one of the pixel units is 4 times a focal length of the convex lens.

2. The display panel according to claim 1, wherein each of the convex lenses is a plano-convex lens or lenticular lens.

3. The display panel according to claim 1, wherein each of the convex lenses corresponds to respective at least one of the functional units.

4. The display panel according to claim 1, wherein the size of each of the pixel units is same as a size of each of the convex lenses, and a curvature radius r of each of the convex lenses satisfies a formula: r=d/4(n−1)>p/2, wherein d represents a distance between the pixel unit and the functional unit, n represents a refractive index of the convex lens, and p represents the size of each of the pixel units.

5. The display panel according to claim 1, wherein a $$s = r - \sqrt{r^2 - \frac{p^2}{4}},$$

thickness s of each of the convex lenses satisfies a formula: wherein r represents a curvature radius of each of the convex lenses, and p represents the size of each of the pixel units.

6. The display panel according to claim 1, wherein the second sub-panel is a light-controlled panel, and the functional unit is a light-controlled unit.

7. The display panel according to claim 6, wherein the light-controlled unit comprises a part of a substrate of the light-controlled panel and a black matrix arranged on the part of the substrate of the light-controlled panel.

8. The display panel according to claim 6, wherein the optical lens layer is configured to form a real image of the light-controlled unit between the light-controlled unit and the pixel unit, a size of the real image of the light-controlled unit is equal to a size of the light-controlled unit, and a distance between the real image of the light-controlled unit and the respective pixel unit is less than a distance between the real image of the light-controlled unit and the light-controlled unit.

9. The display panel according to claim 1, wherein the second sub-panel is a touch panel, and the functional unit is a touch sensing unit.

10. The display panel according to claim 9, wherein the touch sensing unit comprises at least one touch electrode.

11. The display panel according to claim 9, wherein the touch sensing unit is made of Indium Tin Oxide (ITO).

12. The display panel according to claim 9, wherein the optical lens layer is configured to form the real image of the pixel unit between the touch sensing unit and the pixel unit, the size of the real image of the pixel unit is equal to the size of the pixel unit, and a distance between the real image of the pixel unit and the respective touch sensing unit is less than a distance between the real image of the pixel unit and the pixel unit.

13. The display panel according to claim 1, wherein an orthographic projection of the functional unit onto the optical lens layer completely coincides with a respective convex lens.

14. A display device comprising the display panel according to claim 1.

15. The display device according to claim 14, wherein each of the convex lenses is a plano-convex lens or lenticular lens.

16. The display device according to claim 14, wherein each of the convex lenses corresponds to respective at least one of the functional units.

\* \* \* \* \*